United States Patent [19]

Giles et al.

[11] Patent Number: 4,926,308

[45] Date of Patent: May 15, 1990

[54] PROGRAMMABLE MACHINE SYSTEM

[75] Inventors: Alan F. Giles, St. Neots; James M. Moore, Welwyn Garden City, both of Great Britain

[73] Assignee: Unilever Patent Holdings B.V., Rotterdam, Netherlands

[21] Appl. No.: 167,859

[22] PCT Filed: Jul. 10, 1987

[86] PCT No.: PCT/EP87/00370

§ 371 Date: Feb. 10, 1988

§ 102(e) Date: Feb. 10, 1988

[87] PCT Pub. No.: WO88/00728

PCT Pub. Date: Jan. 28, 1988

[30] Foreign Application Priority Data

Jul. 10, 1986 [GB] United Kingdom ................. 8616790

[51] Int. Cl.$^5$ ............................................. G06F 9/06
[52] U.S. Cl. ................................... 364/147; 364/189; 364/468
[58] Field of Search ............... 364/147, 146, 189, 188, 364/468, 191, 192, 200, 900

[56] References Cited

U.S. PATENT DOCUMENTS

| 4,165,532 | 8/1979 | Kendall | 364/146 |
|---|---|---|---|
| 4,167,788 | 9/1979 | Senbo | 364/147 |
| 4,217,658 | 8/1980 | Henry | 364/147 |
| 4,253,148 | 2/1981 | Johnson . | |
| 4,319,338 | 3/1982 | Nijhuis . | |
| 4,425,630 | 1/1984 | Yomogida | 364/146 |
| 4,445,169 | 4/1984 | Wakita . | |
| 4,488,258 | 12/1984 | Struger | 364/147 |
| 4,504,900 | 3/1985 | Yomogida | 364/147 |
| 4,608,628 | 8/1986 | Saito | 364/146 |
| 4,688,193 | 8/1987 | Yamaoka | 364/147 |
| 4,704,676 | 11/1987 | Flanagan | 364/146 |
| 4,710,863 | 12/1987 | Kaufmann | 364/146 |
| 4,777,584 | 10/1988 | Pogue | 364/146 |

FOREIGN PATENT DOCUMENTS

| 3338396 | 5/1985 | Fed. Rep. of Germany . |
| 3504578 | 8/1986 | Fed. Rep. of Germany . |
| 2064920 | 6/1981 | United Kingdom . |

*Primary Examiner*—Michael R. Fleming
*Attorney, Agent, or Firm*—Cushman, Darby & Cushman

[57] ABSTRACT

A programmable machine is provided with a programmed computer and a number of actuators, the operation of the latter being controlled by the computer in conformity with this computer program. The computer also includes an operating program which cooperates with a display device and a data input device for the input of instructions to the computer. The operating program responds to a sequence of the entered instructions displayed on the display device having a separate display field for each actuator or a group of actuators and enabling an operator to enter instructions with the data input device into each field to define the movement of the respective actuator and the relationship between actuators. The display device illustrates the operating sequence of the machine as a diagram. The operating program translates this information into a machine code program controlling the operation of the actuators.

3 Claims, 2 Drawing Sheets

Fig. 2

```
CARTON TOP FOLDING
---------------------
GR1    GR2    GR3    GR4    G5          PARAMETERS & COMMENTS
TRANS- FOLD1  GLUE   FOLD2  EJECTOR
PORT          GUN
SETUP

RECOVER

RUN
MOTOR                                   1 TRANSPORT SYSTEM
       MOTOR                            3; FIRST FOLD ACTUATOR
              MOTOR                     4; GLUE GUN ACTUATOR
                     MOTOR              3; SECOND FOLD ACTUATOR
                            MOTOR       8; EJECTOR MECHANISM
MOVE                                    ┌─A M 1 400 567.12 ; IN CARTON
       WAIT                           8─┘
GO---▶
       MOVE                             A M 1 600 234.23; FIRST FOLD OUT
              WAIT
       GO---▶
              MOVE                      A M 1 600 200      ; GLUE GUN OUT
              MOTOR                     2                  ; PUMP MOTOR
              MOVE                      A M 1 300 567      ; PUMP OUT GLUE
              MOTOR                     4                  ; GLUE ACTUATOR
              MOVE                      A M 0 600 200      ; BACK GLUE GUN
       WAIT
       ◀---GO
                     WAIT
              GO---▶
       MOVE                             A M 0 600 234.23; BACK 1st FOLD
                     MOVE               A M 1 600 234.23; 2nd FOLD OUT
                     PAUSE              M 2000           ; PAUSE 2 SECS.
                     MOVE               A M 0 600 234.23; BACK 2nd FOLD
                            WAIT
GO------------------▶
                            WAIT
                     GO---▶
                                        IN    8              ; CHECK FOLD OK
                                        IF   >127            ; NOT OK
                                        MOVE A M 1 800 200   ; EJECT
                                        MOVE A M 0 800 200
                                        ENDIF
WAIT ◀------------------------GO
END
       END
              END
                     END
                            END
```

PROGRAMMABLE MACHINE SYSTEM

BACKGROUND OF THE INVENTION

It has been proposed that programmable machines be used in the high speed manufacture of consumable products such as foods, detergents and toiletries. Such products are produced by operations which may be carried out at repetition speeds of up to hundreds of operations per minute. Typical manufacture operations for such products include dosing and mixing of materials, and shaping and heat treatment operations when preparing a wide variety of foodstuffs. Packaging such as carton erection and sealing, plastic pouch forming and filling and bottle filling and labelling are also areas in which programable machines have applications.

At present such manufacture requires the use of dedicated machines which are capable only of producing a single product and such a traditional machine usually includes a central electric motor and gear box together with cams, levers and eccentrics for producing the various required motions of its constituent parts. Naturally, such a machine can be designed and built to perform almost any specific task and, by changing the gearing or the cams, levers and eccentrics can be tailored to produce a different size or shape of product or to produce a different product. Naturally, changing such a dedicated machine to produce a different product requires a considerable amount of time and the expertise of a skilled fitter.

Robot arms are now being generally used in industry but only for the handling and assembly of high-value, low volume goods. Such robot arms can be programmed to perform a variety of different movements and so carry out a variety of different operations in response to their programming software. In general, robot arms operate only slowly.

The proposed programmable machine includes a number of actuators, each of which produces controlled movement along a different linear axis, produces controlled rotation, or produces controlled delivery of a particular one of a range of material or, for example, produces controlled quantity of any particular materials to be supplied. The operation of all of the individual machine actuators is controlled by a computer so that entire operating movements of the machine are controlled by software stored in or fed to the computer Such a machine is then capable of changing from the manufacture of one particular product to another by giving an instruction to the computer. Such a machine has considerable flexibility and is able to cope not only with changes from one product to another, but is also able to cope with the changes of a feed back nature to change the operation of the machine to take account of changes in the characteristics of the basic materials being handled by it.

Taking as a specific example the case of a pizza production line: This typically consists of a conveyor to move a prepared pizza base between various application stations. At a first station the pizza bases are placed on the conveyor in a predetermined location and at subsequent stations tomato paste is spread over the surface of a pizza base and this is followed by the application of other particular ingredients depending on the nature of the pizza being produced. The layout or pattern in which the various ingredients are arranged on the pizza base may also need to be varied depending on the particular variety of pizza being manufactured.

A programmable machine for producing such pizzas would have to be capable of handling a variety of different sizes of pizza base and work stations driven by actuators which dispense tomato paste and the other ingredients and place them on the surface of the pizza would have to apply them over the required area dpending upon the size of the pizza base. The machine would also have to supply different quantities of the ingredients for different sizes of base.

Another example of a machine which it would be desirable to produce as a programmable machine is a carton erecting machine. In such a machine, the position of the guide rails and the extent of movement of its various actuators would have to be varied with the size of carton being erected, as would the movement and quantity of glue supplied by a glue applicator. For such a machine the size, shape or style of carton being erected could be changed simply by an instruction to the computer of the machine, although it may also be necessary to supply a different carton blank.

Whilst such programmable machines have been proposed and attempts have been made to produce prototypes, programmable machines are not yet available which are capable of being used in production. Partly this is due to the time taken for a computer to interact with a number of actuators and sensors to control their movement in real time. This time increases with increases in the number of actuators and the resulting bus contention and when a particular profile of movement is required to be calculated for each actuator operation. With such constraints it has not been possible so far to produce a multi-axis programmable machine which is capable of operating at high speed. Another, and probably more serious problem is that such machines require specialist computer programmers to prepare the computer programs that control their operation. It is naturally desirable to have a simple control system for such a machine to enable a typical production engineer with no specialist knowledge of computers or computer programming to be able to set up the required instructions for such a machine.

SUMMARY OF THE INVENTION

According to this invention a programmable machine comprises a programmed computer and a number of actuators, the operation of which is controlled by the computer in response to its application program, the computer including an operating program which cooperates with a display device and a data input device to facilitate the input of instructions to the computer to control the operation of the actuators, the operating program responding to a sequence of the entered instructions displayed on the display device having a separate display field for each actuator or a group of actuators and enabling an operator to enter high level language instructions with the data input device into each field defining the required movement for each actuator and the relationship between actuators, so creating instructions in the form of a required operation sequence diagram on the display device which illustrates the required operating sequence of the machine, the operating program then translating this information into a machine code program which controls the operation of the actuators.

Preferably the separate display fields are arranged as columns to each other on the display.

Preferably the high level language entered in the display fields are simple words describing actuator operation such as would be normally used by a production engineer such as: MOVE; WAIT; GO; PAUSE; IN; and END. Words of this type are also used in some robot languages.

For easier description the expression "computer" may both comprise a single computer and a distributed computer, such as an interconnected host computer, a communications computer, dual memories and microprocessors as exemplified in this specification.

Preferably the programmable machine comprises a number of actuators, a corresponding number of microprocessors, each of which is associated with and arranged to control the operation of an actuator or a group of actuators, an equal number of dual memories, each of which is associated with a microprocessor, a communications computer which operates the operating program in a host computer, and changeover switch means controlled by the communications computer connecting this communications computer and the microprocessors to the dual memories with one part of each dual memory being associated with its microprocessor and the other part of each dual memory being connected to the communications computer when the changeover switch means is in a first state and the other part of each dual memory being connected to its associated microprocessor and the one part of each dual memory being connected to the communications computer when the switch means is in a second state.

Such a programmable machine is capable of operating at high speed because, during operation, each of the actuators is independently controlled by its own associated microprocessor and is arranged to perform an operation controlled by information stored in the part of the dual memory coupled to its microprocessor by the changeover switch means. However, whilst the machine is performing a series of operations the communications computer has access to the dual memories connected to it and so can be loading fresh instructions to its part of the dual memory. The command computer operates the operating program and performs the relatively slow calculations to determine the required movement profiles of the actuators and loads the information via the communications computer into the part of the dual memory to which it is connected by the changeover switch means. After the communications computer has loaded the dual memories associated with all of the actuators with the revised information and instructions corresponding to a change of operation of the machine, when it is desired to make the change, the state of the changeover switch means is simply changed. This connects the microprocessors associated with each actuator to parts of the dual memory that have been loaded with the fresh information and instructions, so that, thereafter, the actuator responds in accordance with this fresh information. This changeover is virtually instantaneous so that there is no interruption in production when changes are required in the operation of the programmable machine.

The changes that may be loaded by the communications computer into the dual memory may be simple changes of a feedback nature to take account of variations of the materials being handled to ensure, as far as possible, a consistent product. Alternatively, the changes may be major changes so that a different product altogether is manufactured by the programmable machine. Taking as an example that already discussed of a pizza production line, the changes may be relatively minor in nature, for example, to change the time or rate required to dispense tomato paste on to the surface of the pizza base to take account of the changes in the consistency of the tomato paste being fed to the production line and, thereby, ensure uniformity of product or, alternatively, the changes may be so great as to enable the production line to handle a different size of pizza base or to manufacture, for example, salami pizzas instead of mushroom pizzas by adding different ingredients to the pizza base during its production.

Preferably the programmed machine includes its own, separate clock generator to produce timing signals which are fed to all of the microprocessors. In this case, the operation of all of the actuators is controlled in response to the timing signals received from the separate clock generator to ensure that all of the actuators, and hence the entire machine, operates in synchronism. In this way the entire machine continues to operate in synchronism, irrespective of the speed at which the machine is operated. In addition, the actuators may also be arranged to operate for a given real time, irrespective of the speed of the machine. An example of such an operation is the operation of a glue applicator nozzle. It is required to apply glue for a constant time during the movement of the glue application nozzle along a flap of a carton to be erected, irrespective of the speed of operation of the machine.

Preferably the programmable machine is organised so that the dual memory contains a sequence of bytes containing instructions and data to define all the actions required in a machine cycle by the particular actuator associated with that memory. Motion profiles for the actuator are preferably defined by a data block containing a table of incremental motor drive pulse intervals and then, as the memory is stepped through the instructions and data by the machine clock generator, the incremental motor drive pulses are fed to the actuator to cause it to perform the required action. This is repeated for each cycle of the machine.

In general, it is preferred that the microprocessors associated with each of the actuators do not perform any calculations or operations on data stored in the dual memory but simply control the operation of the actuator in response to the instructions and data loaded into the part of the dual memory currently connected to the microprocessor to ensure the highest speed of operation of the machine. The command computer, on the other hand, is typically a much more sophisticated computer and operates a more sophisticated program which not only includes the operating program to translate the high level language instructions entered by a production engineer, but also calculates motion profiles required by the actuator for specific tasks and establishes a data block containing the incremental drive pulses. In general, the speed of operation of the host computer is not critical since the data and information being loaded into the parts of the dual memories connected by the communications computer to the host computer is in respect of a future change in the operation of the machine and, in general, such a change can take place in a few machine cycle times.

BRIEF DESCRIPTION OF THE DRAWINGS

Various examples of a programmable machine in accordance with this invention will now be described with reference to the accompanying drawings and appendices:

FIG. 2 is an operating sequence display diagram for a box folding machine; and

DESCRIPTION OF THE PREFERRED EMBODIMENT

Figure 1:
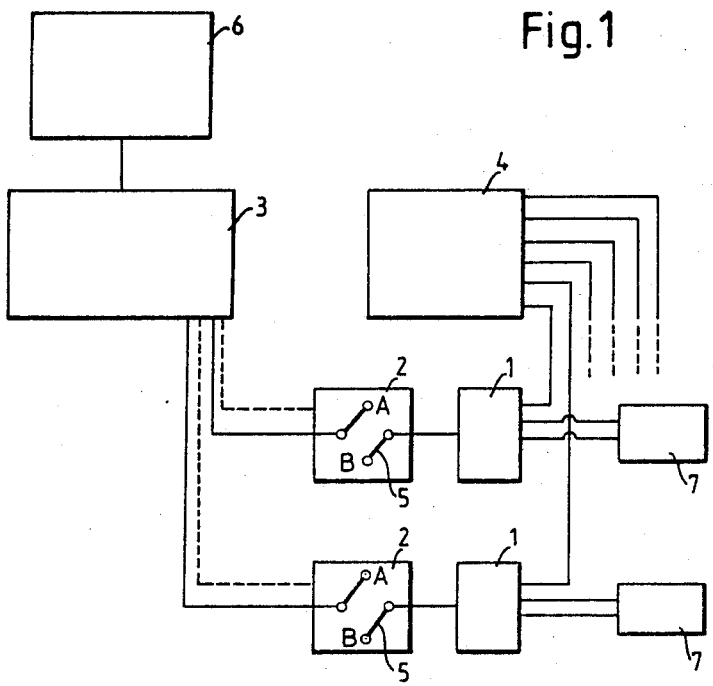
FIG. 1 is a generalised block diagram of the machine.

The programmable machine includes a number of actuators 7 arranged to perform movement, provide rotation, or control the feed of some material. Each of the actuators is driven by an actuator drive including a microprocessor 1 and a dual memory 2. In FIG. 1, only the actuator drives for two axes are shown, but, in practice, there would be a drive for each axis of the machine. The programmable machine also includes a communications computer 3 which is also connected to all of the dual memories 2, and a machine clock pulse generator 4 which is connected to each of the microprocessors 1. A command computer 6 is connected to the communications computer 3. A changeover switch 5 is included in each of the dual memories 2 and the state of this switch is controlled by the communications computer 3.

With the changeover switch 5 in its first state, each microprocessor 1 is connected directly to part A of its dual memory 2 and sends control pulses to its associated actuator according to the instructions contained in part A of its dual memory 2. Timing of the feed of instructions from the microprocessor 1 to the actuator is in accordance with the pulses generated by the machine clock pulse generator 4. Whilst the microprocessors 1 are controlling the operation of their associated actuators, the command computer 6 can be loading fresh information and fresh data into part B of each of the dual memories 2 via the communications computer 3 and the changeover switch 5. When it is required to change the operation performed by one or more of the actuators, the communications computer 3 sends an instruction to each of the changeover switches 5 to connect the microprocessors 1 to part B of the dual memory 2 and to connect the part A of each of the dual memories 2 to the communications computer 3 and thereby to the command computer 6. Each of the microprocessors 1 then controls the operation of its associated actuator in response to the data and instructions contained in part B of the dual memory 2 whilst the command computer 6 can obtain direct access to the parts A of the dual memories 2 to load them with fresh data and instructions for a following change in the actuators.

The operating program compiled by the command computer 6 is as follows:

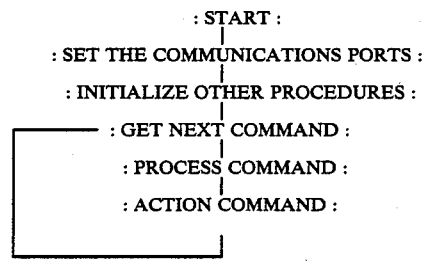

This program is very simple and easy for non-computer experts to program. The operating program produces a block of data which is loaded via the communications computer into one dual memory 2. The microprocessors 1 look in the dual memory 2, whichever part thereof is currently connected, for the next command, it then carries out any processing required on that command and actions it in response to a timing signal from the machine clock and then simply loops back to get the next command. Such a program is capable of operating rapidly.

The input terminal receives machine clock pulses from the pulse generator 4 that are fed to all of the microprocessors 1. All motions can be defined in units of the machine clock to enable the whole machine to move in synchronism at a speed determined by the machine clock. Other input terminals may receive sensor data to enable the microprocessor 1 to check that the actuator has performed an operation correctly, or, for example, to trigger a particular operation after a sensor has been actuated.

Means of communicating between microprocessors is implemented in the software of the communications computer. By this means, for example, information about an object being processed can be passed through the machine and accessed as required by the microprocessors. In its simplest form this passing of information can be considered as the setting and clearing of flags. Thus, to signal from one microprocessor 1 to another it sets a flag, the other microprocessor looks at the set flag and resets it before acting on it, thus completing the handshake.

The host computer 6, such as an IBM PC/XT, contains an editor and PROMAC compiler program. A PROMAC source program is written as a text file using the editor and this can then be modified as many times as required to take account of the particular movements required for the machine. The source program is structured to look like an operating sequence diagram as shown in FIG. 2. Each actuator of the machine is allocated a tab column. Command words which are simple words such as would normally be used by a production engineer are written into their appropriate column using a data input device such as a keyboard by the production engineer. Arguments to the commands can appear on the right hand side of the display, such as on the line indicated with reference numeral 8: a=move type: a meaning constant speed; m=machine time; 1=direction; 400=number of steps; 567.12=velocity in steps per second, and comments, which are optional, can appear beyond. Command word GO signals that an action in another axis should begin, and command word WAIT signals that a due should be expected. The compiler program allocates a spare flag for the WAIT . . . GO operation.

Movements are programmed to occur by the command word MOVE. The argument for the MOVE instruction can simply be jerk, acceleration, velocity and distance data as required or it can refer to a file in which profile data are stored corresponding to the motion that is required of that particular actuator. Movements of the actuator can be defined in terms of machine clock units or real time units. Command word OUT enables output lines to be operated and a command word IF reads a specified data line and facilitates the required Boolean function. The command word SHIFT reads input lines into a shift register and command words TIMER and PAUSE specify a pause in real time or machine clock units.

On compilation the operating program works through a source text file to produce the instruction data blocks required for the incremental motor pulses required for each actuator and loads these data into whichever part of the memories are currently connected to the communications computer 3.

Figure 3:
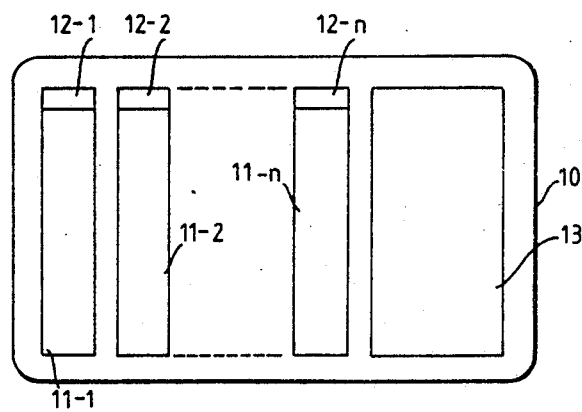
FIG. 3 is a schematical representtion of a display divided into fields.

FIG. 3 shows schematically how the display is divided into fields: a display 10 which is usually rectangular is divided into a number of separate display fields 11-1 ... n each one for an actuator or a group of actuators.

In the separate fields, which preferably are vertical columns, instructions are displayed corresponding to the instructions entered into the computer. These instructions may comprise high level language such as WAIT, GO, PAUSE, MOVE, IN and END. In a separate field 13 arguments defining speed, direction, time, distance etc. without the respective units may be entered. If the display is not large enough for containing the entire sequence of movements and all columns simultaneously usual scrolling may be used.

We claim:

1. A programmable machine comprising:
    a number of actuators each having a controllable operation;
    a display device for displaying information;
    a data-input device adapted to receive input of programming language instructions of a type to control the operation of the actuators; and
    programmed computer means, coupled to said actuators to control said operations of said actuators, coupled to said display device to operate same, and coupled to said data-input device to receive programming language instructions therefrom, for:
    (1) arranging an operation program as high level language instructions received from said data input device as divided into separate display fields, each said display field including different types of information, and such that the instructions for each actuator or group of actuators in each of said separate display fields are arranged as vertical columns, each column defining a required movement for each actuator and a relationship between actuators,
    (2) translating said instructions which are displayed into a machine code program which controls the operation of the actuators, and
    (3) displaying said operation program formed of said programming language instructions so creating an operations sequence diagram on the display device illustrating a required operating sequence of the machine.

2. A programmable machine as in claim 1 wherein said programmed computer means includes at least a microprocessor associated with an actuator and a communications computer, and further comprising a dual memory device, having at least two memory positions, one of said memory positions feeding information to said microprocessor for said actuator, and another of said positions allowing said communications computer to write information to said dual memory device.

3. A programmable machine comprising:
    a number of actuators each having a controllable operation;
    a display device for displaying information; and
    programmed computer means, coupled to said actuators to control said operations of said actuators, and coupled to said display device to operate same, for:
    (1) arranging an operation program as high level language instructions divided into separate display fields, each said display field including different types of information such that the instructions for each actuator or group of actuators in each of said separate display fields are arranged as vertical columns, each column defining a required movement for each actuator and a relationship between actuators,
    (2) translating said instructions which are displayed into a machine code program which controls the operation of the actuators, and
    (3) displaying said operation program formed of said programming language instructions so creating an operations sequence diagram on the display device illustrating a required operating sequence of the machine.

* * * * *